J. BUCK.
BUNG-FUNNEL.
No. 6,784. Reissued Dec. 7, 1875.
*Fig. 1.* *Fig. 2.*
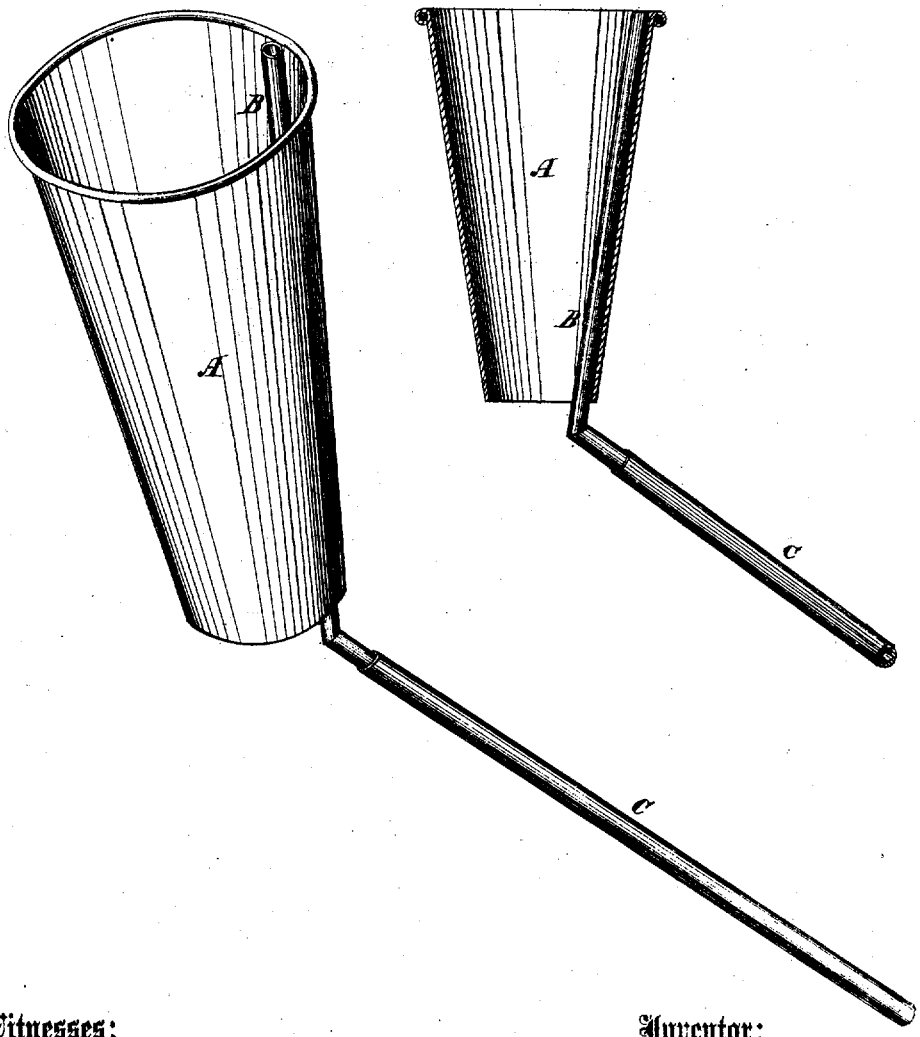
Witnesses:
P. C. Dieterich
Francis M. Wright
Inventor:
J. Buck
PER
Attorneys.
N. PETERS, PHOTO-LITHOGRAPHER, WASHINGTON, D. C.

UNITED STATES PATENT OFFICE.

JAMES BUCK, OF BALTIMORE, MARYLAND.

IMPROVEMENT IN BUNG-FUNNELS.

Specification forming part of Letters Patent No. 118,337, dated August 22, 1871; reissue No. 6,784, dated December 7, 1875; application filed October 7, 1871.

*To all whom it may concern:*

Be it known that I, JAMES BUCK, of Baltimore, in the county of Baltimore and State of Maryland, have invented a certain Improvement in Device for Emptying Barrels, of which the following is a specification:

This invention relates to a device for emptying barrels, hogsheads, &c.; and consists in a tapering discharge-pipe and air-tube, as hereinafter more fully described.

In the accompanying drawing, Figure 1 is a perspective view of the instrument. Fig. 2 is a longitudinal section of the tapering pipe with the air-tube attached.

Similar letters of reference indicate corresponding parts.

A is the tapering discharge-pipe. B is the part of the air-tube which is made fast to the pipe A. This tube extends from the top of and within the pipe A, parallel with the side thereof, and passes from the smaller end thereof, having an angle or elbow, which throws the outer part C of the air-tube at an angle of forty-five degrees, more or less, with the part B, as represented in the drawing. The pipe A is made tapering, so that its small end will fit into, and may be driven into, the bung-hole of a barrel or hogshead, and make a liquid-tight joint.

In emptying a barrel or hogshead which contains liquors, molasses, or liquids of any kind, the part C is first introduced after the bung is removed, and the pipe A is then tightly driven into the bung-hole, in such a manner that the tube C will be about parallel with the heads of the barrel. The barrel, being elevated, is rolled partly over, to allow the liquid to escape through the pipe A. As the liquid escapes the air enters through the air-tube, and preserves an equilibrium of atmospheric pressure within and without the barrel, and allows the liquid to flow freely therefrom.

By this device no vent-holes bored through the barrel are necessary. The tapering pipe A being driven tightly into the bung-hole, the air enters as the liquid leaves, and the barrel is rolled till all the liquid is discharged. The result is a great saving in time and trouble in emptying hogsheads, barrels, pipes, &c.

I do not claim, broadly, admitting air through a tube, to take the place of the liquid, in discharging liquid from vessels. I am aware that such tubes have been used in discharging oil from tin cans or lamp-fillers.

My air-tube and discharging-pipe is not permanently attached to the vessel, but is used from one barrel to another, so that many barrels may be emptied thereby in a single hour.

Having thus described my invention, I claim as new and desire to secure by Letters Patent—

A tapering tube, A, adapted to be used either as a discharge or filling conduit, in combination with an air-pipe passing through the same, and bent to one side at a point beyond the smaller end of the said tapering tube, as and for the purpose specified.

The above specification of my invention signed by me this 25th day of September, 1871.

JAMES BUCK.

Witnesses:
GEO. W. MABEE,
T. B. MOSHER.